March 28, 1944.  L. H. PETER ET AL  2,345,499
ALTERNATING CURRENT RECTIFIER APPARATUS OF
THE DRY SURFACE CONTACT TYPE
Filed Oct. 17, 1942

INVENTORS
Leslie Hurst Peter and
Sydney Arthur Stevens
BY
THEIR ATTORNEY

Patented Mar. 28, 1944

2,345,499

UNITED STATES PATENT OFFICE 2,345,499

ALTERNATING CURRENT RECTIFIER APPARATUS OF THE DRY SURFACE CONTACT TYPE

Leslie Hurst Peter and Sydney Arthur Stevens, London, England, assignors, by mesne assignments, to The Union Switch and Signal Company, Swissvale, Pa., a corporation of Pennsylvania Application October 17, 1942, Serial No. 462,374
In Great Britain June 6, 1941

1 Claim. (Cl. 175—366)

This invention relates to alternating current rectifier apparatus of the dry surface contact type of the kind comprising a number of rectifier elements superposed one upon the other in a pile or column.

Interposed between each or certain of adjacent pairs of the rectifier elements in the pile or column is a spacer member associated with a connector member also serving as a cooling fin for the purpose of dissipating the heat generated in the rectifier elements during operation.

It will be understood that the purpose of the spacer members is to provide the necessary intervals between the cooling fins required for the necessary electrical connections and the effective circulation of air or other cooling fluid, and the invention has for its object to provide improved arrangements for enabling the connections between the members to be readily and conveniently effected, whereby the manufacture and assembly of the rectifier is facilitated and cheapened.

According to the invention each or certain of the connector or cooling fin members is provided with a connection lug adapted to be secured to the member at one or other of two or more alternative positions each of which is asymmetrically situated relative to the centre line of the member and so as to project outwards from the member in substantially the plane thereof. By reversing the position of the connector member in the column a further equal number of possible positions of the connection lugs relative to the centre line of the member is thus obtained so that when the rectifier is assembled the lugs of the connector members will lie in a corresponding number of straight lines on one side or the other of the plane containing the centre lines of the connector members and the lugs in each line may thus be electrically connected together by straight bars or wires.

The invention is illustrated by way of example in the accompanying drawing.

Figure 1:
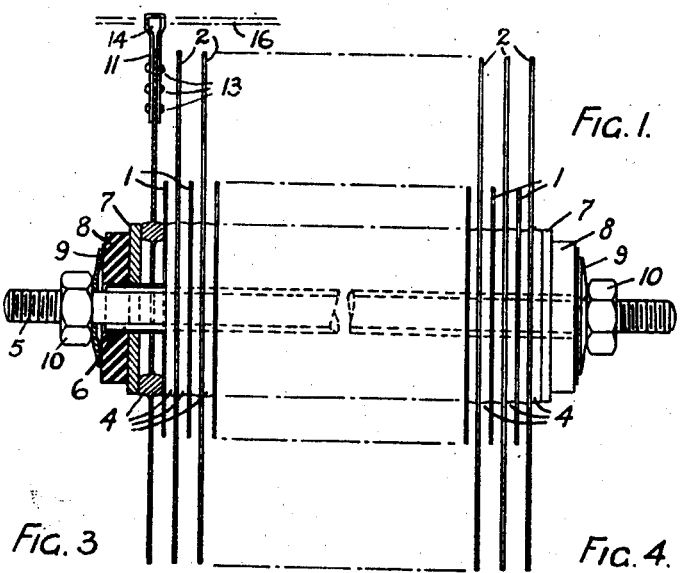
Figure 2:
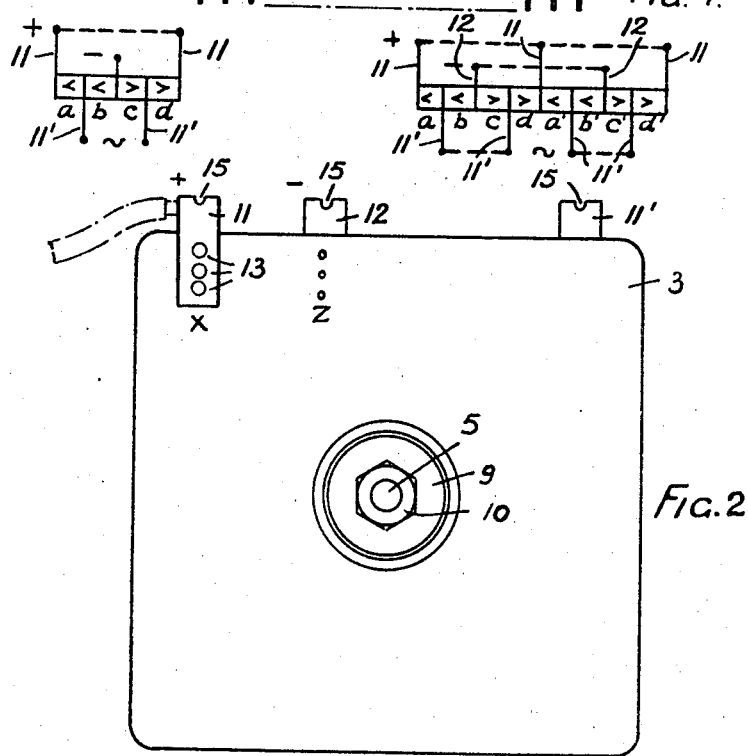

Figure 1 of which is a view in side elevation partly sectional of a rectifier comprising connector or cooling fin members constructed and arranged in accordance with one form of the invention, Figure 2 being a view thereof in end elevation.

Figures 3, 4:
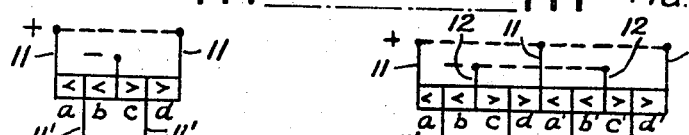
Figure 5:
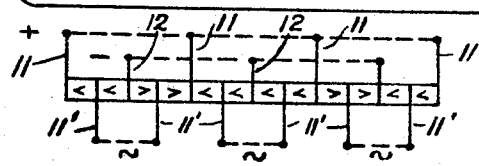

Figures 3, 4 and 5 are diagrams illustrating various methods of connection of the rectifier elements in accordance with the invention.

Referring now to Figures 1 and 2 it will be seen that the rectifier comprises a number of rectifier elements 1 separated by cooling fins 2, 3 each consisting of a rectangular aluminum plate provided on each face with a central annular rib or boss 4 formed integral with the plate which serve to space the cooling fins apart from one another. The elements 1 and the cooling fins 2, 3 are each provided with a central aperture for accommodating a bolt or spindle 5 surrounded by an insulating sleeve 6 on which the elements and fins are mounted, a metal washer 7, an insulating washer 8 and a spring washer 9 being provided at each end of the spindle 5 together with nuts 10 for clamping the whole assembly together.

Certain of the fins as for example that indicated at 3 in Figures 1 and 2 and hereinafter termed connector plates, are provided with a connection member or lug 11, 12 consisting of a rectangular strip of tin-coated copper sheet folded on itself so as to form a clip adapted to be fitted on to the edge of the plate 3 and secured thereon by transverse rivets 13 extending through the lug 11 and the plate 3, two sets of rivet holes being provided at different distances from the centre of the plate so as to provide alternative positions indicated at X and Z for the attachment of the lug 11. The outer end of the lug 11, that is to say, the folded end of the strip of which the lug is composed is so formed as to provide a cylindrical channel 14 parallel to the edge of the connector plate 3, this end of the lug being also provided with a longitudinal slot 15 at right angles to the plate 3.

Before the rectifier elements are assembled a lug is attached to each or certain of the connector plates at one or other of the alternative positions of attachment X or Z, being secured so that after assembly the lugs 11 or 12 of the connector plates to be electrically connected together all lie in a straight line parallel to the bolt or spindle 5, having lugs 11 and 11' attached in the X position.

By assembling the connector plates in a normal or reverse position (as indicated at the right and left hand sides of Figure 2) two such lines of connection can evidently be formed while a third line is formed by the lugs 12 attached to connector plates in the Z position. A corresponding number of the connector plates may thus be conveniently electrically connected by means of a wire, bar or strip (indicated in dotted lines at 16 in Figure 1) entering the slots 15 in the aligned lugs of the connector plates and secured thereto by soldering.

It will be understood that by assembling certain of the connector plates (having lugs attached in the Z position) in a reverse position a fourth line of connection is formed.

The terminal connections or connections between assembled rectifier units on two or more different spindles or rods are effected by bars, wires or cables adapted to enter the cylindrical channels 14 in the lugs of the connector plates required to be thus connected.

Referring now to Figure 3 it will be seen that the rectifier unit illustrated comprises four sections $a$, $b$, $c$, $d$ each comprising a number of rectifier elements arranged as to their direction of current flow as indicated by the arrows together with cooling fins 2 between each element. The sections are separated by connector elements having lugs 11' and 12 while connector elements having lugs 11 are provided at each end of the unit. The two lugs 11 are connected together as above described to constitute the positive rectified current terminal of the unit, the lug 12 constituting the negative terminal, while the lugs 11' constitutes the input or alternating current terminals.

Referring now to Figure 4 a rectifier unit is illustrated comprising eight sections $a$, $b$, $c$, $d$ and $a'$, $b'$, $c'$, $d'$ arranged in two parallel-connected groups each similar to the unit of Figure 3. The three lugs 11 connected together constitute the positive rectified current or output terminal, the connected lugs 12 constituting the negative or other output terminal while the pairs of conected lugs 11' constitute the input or alternating current terminals.

Figure 5 illustrates a three phase rectifier unit comprising three groups of rectifier sections each similar to that of Figure 3, the three pairs of connected lugs 11' in this case constitute input terminals connected to the three phases of the supply circuit.

Many other systems of connections of the sections of a rectifier unit may be formed in a similar manner and it will be evident that a relatively large number of different systems of connection may thus be effected by means of straight bars or wires thus greatly facilitating ready assembly.

The invention is evidently not limited to the particular construction of connector plates and lugs above described and illustrated by way of example which may be varied as desired in order to meet particular conditions.

Having now particularly described and ascertained the nature of our said invention and in what manner the same is to be performed, we declare that what we claim is:

Alternating current rectifier apparatus comprising a plurality of rectifier elements arranged in a column together with connector members disposed in said column in which the connector members are each provided with a connection lug adapted to be secured to the member at a different one of two or more alternative positions each of which is asymmetrically situated relative to the center line of the member and so as to project outwards from the member in substantially the plane thereof, whereby by reversing the positions of some of the connector members in the column with respect to the others a number of possible positions of the connector lugs equal to twice the number of possible lug positions for each connector is obtained so that when the rectifier is assembled the lugs of the connector members will be in a corresponding number of straight lines on one side or the other of the plane containing the center line of the connector members and the lugs in each line may be electrically connected together by straight bars or wires.

LESLIE HURST PETER.
SYDNEY ARTHUR STEVENS.